(12) United States Patent
Maynard (10) Patent No.: US 11,741,542 B2
(45) Date of Patent: **\*Aug. 29, 2023**

(54) FPGA CIRCUIT FOR PROCESSING ELECTRONIC MESSAGES IN A DISTRIBUTED COMPUTER SYSTEM

(71) Applicant: Nasdaq ISE, LLC, New York, NY (US)

(72) Inventor: Greg J. Maynard, Port Washington, NY (US)

(73) Assignee: Nasdaq ISE, LLC, New York, NY (US)

( * ) Notice: Subject to any disclaimer, the term of this patent is extended or adjusted under 35 U.S.C. 154(b) by 158 days.

This patent is subject to a terminal disclaimer.

(21) Appl. No.: 17/165,166

(22) Filed: Feb. 2, 2021

(65) Prior Publication Data

US 2021/0158446 A1    May 27, 2021

Related U.S. Application Data

(63) Continuation of application No. 15/690,698, filed on Aug. 30, 2017, now Pat. No. 10,915,953, which is a
(Continued)

(51) Int. Cl.
    *G06Q 40/04*     (2012.01)

(52) U.S. Cl.
    CPC .................. *G06Q 40/04* (2013.01)

(58) Field of Classification Search
    USPC ........................................................ 705/37
    See application file for complete search history.

(56) References Cited

U.S. PATENT DOCUMENTS

| 8,224,741 B2 | 7/2012 | Maynard |
| 9,038,189 B1 | 5/2015 | Stevens |
| (Continued) | | |

FOREIGN PATENT DOCUMENTS

| WO | 2000/50974 | 8/2000 | |
| WO | WO-0050974 A2 * | 8/2000 | ............. A63F 13/12 |

OTHER PUBLICATIONS

Morris, Gareth, "FPGA accelerated low-latency market data feed processing", 2009, IEEE, 17th IEEE Symposium on High Performance Interconnects, pp. 83-89. DOI 10.1109/HOTI.2009.17 (Year: 2009).*

(Continued)

*Primary Examiner* — Ambreen A. Alladin
(74) *Attorney, Agent, or Firm* — Nixon & Vanderhye P.C.

(57) ABSTRACT

A distributed computer system includes a matcher server that stores an order book of pending orders and a gateway that routes an order message to the matcher server for matching. The gateway also receives individual quote messages bundled into a mass quote message, each individual quote message including a price value for one of a plurality of different instrument identifiers. The gateway routes the mass quote message to a field programmable gate array (FPGA) circuit without involving the matcher server. The FPGA parses and stores data for each individual quote message to a data structure located in the memory of the FPGA. The parsed data is organized in the data structure according to both the instrument identifier and a client identifier that corresponds to a client that sent the mass quote message. The FPGA receives away market feed messages that each include a price value and a corresponding instrument identifier without first being routed through the matcher server or the gateway and updates the data structure. The FPGA delivers, in response to a query sent as part of the matching process performed on the matcher server for the
(Continued)

instrument, information stored in the data structure regarding the instrument.

16 Claims, 9 Drawing Sheets

Related U.S. Application Data continuation of application No. 13/834,843, filed on Mar. 15, 2013, now abandoned.

(56) References Cited

U.S. PATENT DOCUMENTS

| | | |
|---|---|---|
| 2006/0059072 A1 | 3/2006 | Boglaev |
| 2008/0133395 A1* | 6/2008 | Jimenez .................. G06Q 40/00 705/37 |
| 2009/0182683 A1* | 7/2009 | Taylor .................... G06Q 40/06 705/36 R |
| 2011/0179050 A1* | 7/2011 | Parsons .................. G06Q 40/06 707/755 |
| 2012/0095893 A1* | 4/2012 | Taylor .................... G06Q 40/00 705/35 |
| 2014/0279342 A1 | 9/2014 | Maynard |

OTHER PUBLICATIONS

Lockwood, John et al. A Low-Latency Library in FPGA Hardware for High-Frequency Trading (HFT), 2012, 2012 IEEE 20th Annual Symposium on High-Performance Interconnects, pp. 9-16. DOI 10.1109/HOTI.2012.15 (Year: 2012).*

U.S. Appl. No. 15/690,698, filed Aug. 30, 2017, Inventor: Maynard.

Final Office Action dated Jul. 9, 2020 in co-pending U.S. Appl. No. 15/690,698 13 pages.

Office Action dated Mar. 20, 2020 in co-pending U.S. Appl. No. 15/690,698 14 pages.

International Search Report dated Aug. 22, 2014 in corresponding PCT Application PCT/US14/23183, 4 pages.

* cited by examiner

FIG. 7

FPGA CIRCUIT FOR PROCESSING ELECTRONIC MESSAGES IN A DISTRIBUTED COMPUTER SYSTEM

This application is a continuation of U.S. patent application Ser. No. 15/690,698, filed Aug. 30, 2017, which is a continuation of U.S. patent application Ser. No. 13/834,843, filed Mar. 15, 2013, the contents of which are incorporated herein by reference.

BACKGROUND

Technical Field of the Related Art

Disclosed are systems and methods for receiving and processing messages.

Background Discussion

Modern exchanges provide a marketplace where investors can buy and sell a variety of instruments. In the past, these markets operated by having brokers for buyers and sellers physically located on a trading floor with transactions conducted face-to-face. Because face-to-face transactions take place at a relatively slow pace, the speed at which orders and other messages are received at the exchange did not impact the liquidity or performance of the market, increasingly, financial exchanges conduct transactions within computerized systems where orders to buy and sell instruments takes place automatically.

Markets also disseminate price information in the form of a market data feed. Price information consists of the best bid and offer price for each financial instrument bought or sold on each market. There are many types of products in the financial world, but the three with the highest transaction volumes are Stocks, Futures and Options.

A stock market is where investors buy or sell equity shares in companies or in Exchange Traded Funds that own groups of shares. The best bid and lowest offer in each stock is broadcast as market data. Traders can enter orders that match automatically with each other to create a trade, or brokers can agree to do a trade and just report the trade to the exchange. The market data from the stock markets in the US is measured in thousands of updates per second.

Futures markets are where producers of commodities, such as wheat or coal, sell their products to commodity users, such as bakers or power stations. On a futures market, investors buy and sell contracts to purchase or deliver a commodity at a future date for a specific price. The traders can then place buy and sell orders to trade amounts of the commodity at the agreed price on the agreed date. This means that for each commodity, such as wheat, there are multiple futures contracts that traders can buy and sell with different delivery dates and different exercise prices. A single commodity may be traded on a futures exchange via dozens of contracts depending on how far out in time the exchange lists the contracts. As such, futures have more variations that the stock market, and more data. Chicago Mercantile Exchange ("CME"), for example, lists futures on about 50 different products which have about 12 contracts each, and so the CME supports trading on at least 600 different contracts. The CME also has a great deal of data because it lists options on the futures.

Options are contracts to buy or sell a specific underlying financial instrument at a future date for a specific price. The contract specifies the price at which the contract may be exercised and an expiration date. As used herein, a product refers to a range of derivative instruments (e.g., option contracts) that relate to the same underlying instrument, for example, all options on an IBM stock. An Instrument refers to one stock, or one option or future contract into which orders can be entered and traded.

Within one product there cart be thousands of option instruments with different strike prices and exercise dates. In order to ensure that adequate liquidity exists in a market, exchanges designate certain entities as market makers. A market maker is someone that enters bids and offers, known as quotations, into the market against which the orders from other market participants can trade. The exchange requires that the Market Makers provide quotes in all or a certain number of instruments in each product for which it is assigned.

By way of background, markets rely on the skills of market professionals known as market makers, who are responsible for maintaining liquidity in the market. market makers fulfill this responsibility by ensuring that there is always a two-sided market through providing prices (quotations) at which they are both willing to buy (bid) and sell (offer) a particular option contract and honoring those quotations when trading with incoming orders.

In an electronic market, market makers provide constant quotes—a price to buy and a price to sell a particular financial instrument. As used herein, financial instrument includes a derivative instrument, such as an options contract to purchase or sell a quantity of an underlying instrument, for example, shares of stock. As used herein, a product refers to a range of derivative instruments (e.g., option contracts) that relate to the same underlying instrument, for example, all options on an IBM stock. Some market makers for an options market provide quotes in all instruments (i.e., all options traded on the market). As the market moves, the market makers update their quotes accordingly. The quotes are live and can be traded against by any other party. Options are particularly challenging for market makers because a very large number of instruments may be traded on a single exchange. For instance, the International Stock Exchange (ISE) at present trades 500,000 different instruments—and this number grows over time. Many market makers submit firm quotes for all 500,000 instruments. To maintain accurate prices for all their quotes, market makers need to be able to update their quotes quickly. ISE provides market makers with special mass quote functions that allow them to update their quotes in many instruments in a single message. The number of Mass Quote messages that can be processed by ISE is limited by the speed of the servers and networks. For example, at present, ISE will accept up to 40,000 Mass Quote update messages from a single market maker in a single second. But when the stock market moves quickly, even this large capacity is not sufficient for the market makers to move all their quotes in all instruments.

Additionally, exchanges try to improve liquidity by authorizing numerous market makers to participate in each product. There are some products with over 3,000 different options instruments. There can be 30 market makers in one product, all trying to enter their bid and offer quotes for options instruments into the market and maintain their prices as the market is moving up and down. To avoid having quotes trade at disadvantageous prices and to assure that their quotes remain marketable, each market maker must update thousands of instruments any times per second.

BRIEF DESCRIPTION OF THE DRAWINGS

The present invention will be understood more fully with reference to the drawings. The drawings are provided for the purpose of illustration and are not intended to limit the invention.

SUMMARY

In an embodiment, disclosed is as system, method, and means and computer program products for receiving and processing messages for a financial exchange comprising: a matcher server; and a integrated circuit component configured to receive and process information associated with a financial instrument operatively connected to the matching server, wherein the integrated circuit component is configured to receive and store a plurality of messages from at least one computer server, each message of the plurality of messages being comprised of at least one message type. The integrated circuit component can comprise an FPGA or an ASIC. The message type can an away market price update of the financial instrument, including a price from other markets for instruments, and wherein the integrated circuit component stores the most recent away market prices and exchange codes for the each instrument. The server can be configured to a query to the integrated circuit component and the integrated circuit component is configured to provide the most recent away market prices for the financial instrument in response to the query. The plurality of messages can be received via a consolidated market data feed.

In an embodiment, the type of message for the plurality of messages can include a mass quote message, each mass quote message being sent from one of a plurality of market makers, and each mass quote message including a plurality of quotes for the financial instruments. The integrated, circuit component can be configured to receive the mass quote messages and wherein the integrated circuit component can be configured to parse each of the mass quote messages to separate out the plurality of quotes for the financial instruments and store the most recent quote for each market maker for each of the financial instruments. The integrated circuit component comprises a data storage format for storing information comprising information associated with financial instruments and market makers. The storage format can be a table, where each row of the table corresponds to each of a plurality of financial instruments and wherein each column corresponds to each of a plurality of market makers; or each row of the table corresponds to each of a plurality of market makers and wherein each column corresponds to each of a plurality of financial instruments. The integrated circuit component can configured to store at least one of the mass quote messages from each market maker in a corresponding column or row of a table, with portions of the mass quote message corresponding to the plurality of financial instruments stored in corresponding column or rows of the table.

In an embodiment, the integrated circuit component can be configured to generate market data from the plurality of quotes. The matcher server can be configured to send a query to the integrated circuit component, and the integrated circuit component is configured to provide the most recent information stored in the integrated circuit component corresponding to the financial instrument, and wherein the matcher server uses the most recent information to determine if an order has been processed. The integrated circuit component can be configured to send acknowledgement messages in response to the receipt of quote messages. The acknowledgement messages cart include sequence numbers, wherein the sequence numbers represent one or more quotes being processed by the matcher server and a more recent quote is received by the integrated circuit component.

In an embodiment, the plurality of message types includes can trading state messages, and wherein the integrated circuit component can be configured to receive the trading state messages, determine if the trading state of the underlying market has changed; and if the trading state of underlying market has changed, send a notice to the matching server relating to the contents of the trading state message.

In an embodiment, the plurality of message types can include underlying price messages comprising underlying financial instrument price information, and the integrated circuit component can be configured to: receive the underlying financial instrument price messages; read the underlying financial instrument price messages for an update in the price of the underlying financial instrument; and update information relating to the underlying financial instrument price.

In an embodiment, disclosed is a method for generating market data by an integrated circuit component comprising: receiving order information from a matcher server; electronically updating a quote for a financial instrument order in a data record; pulling all information relating to market data from instruments contained in the data record; and generating the market data from the pulled information. The integrated circuit component can comprise an FPGA or an ASIC. The method for generating market data by the integrated circuit component can further comprise: upon updating a quote, determining a best bid and a lowest offer of all the quotes and the orders; and generating a market data message for the instrument. The method for generating market data by the integrated, circuit component can further comprise: updating a plurality of quotes via a mass quote message, and generating a further update for each instrument quote comprising information that each quote updated and that the best bid or offer for the instrument changed. The method for generating market data by the integrated circuit component can further comprise: upon receipt of order and trade information for an instrument from the matcher server, updating the order information for the instrument, updating the trade statistics for the instrument, and adding a traded quantity against each quote that traded in the instrument. The method for generating market data by the integrated circuit component can further comprise; examining the orders, quotes, trade statistics and trading state for the instrument, and generating a market data message for this instrument.

In an embodiment, disclosed is a method for determining the state of an underlying market using an integrated circuit component comprising: receiving trading state messages in the integrated circuit component, wherein the trading states indicates that the state of an underlying financial instrument has changed; and if trading state of underlying market has changed, sending a notice from the integrated circuit component to a matcher server relating to the contents of the trading state message. The integrated circuit component comprises an FPGA or an ASIC.

DETAILED DESCRIPTION OF EXAMPLE EMBODIMENTS

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used herein, the indefinite article "a" or "an" and the phrase "at least one" shall be considered, where applicable, to include within its meaning the singular and the plural, that is, "one or more."

The detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media.

To provide faster processing speeds for some types of messages, disclosed herein are embodiments of systems and methods that include using integrated circuits such as field programmable gate arrays ("FPGA") application-specific integrated circuits ("ASIC") or other logical and programmable circuits to consolidate data from messages, including market data feed and mass quote messages, and to speed the process of identifying relevant portions of those messages. Although embodiments are described in terms of an FPGA, the embodiments are not limited to FPGAs but also include other integrated circuits such as ASICs that can be configured to process data as described herein. The embodiments are not limited to options exchanges, but could be applied to other types of exchanges including those that trade stocks, futures contracts, currency contracts, commodities, currencies, or other assets.

Embodiments of the invention will be described in terms of an automated exchange market for stock options; options being contracts for the purchase or sale of a listed security at a particular strike price to be exercised on a particular date in the future. The invention is not limited to markets for stock options and includes markets for derivative instruments on any underlying instrument, including equity stocks, currencies, futures, commodities, exchange traded funds, bonds and the like. Embodiments of the invention can be adapted to any environment where large numbers of trades, messages, or mass quotes are submitted by high frequency traders.

An automated exchange according to the invention is administered by a business entity, for example, the International Securities Exchange LLC (ISM of New York, N.Y., which authorizes certain persons as members. The business entity may authorize different types of members or participants, such as a primary market maker (PMM) and one or more competitive market makers (CMMs) to enter quotations in particular classes of options. Market makers are authorized to maintain a two-sided market in one or more instruments by providing firm quotes to buy and sell.

It is to be understood that the names, types and arrangement of participants and quotes are used as examples for purposes of illustration. It is to be understood that the particular arrangement of participants and quotes may be varied and remain within the scope of the invention. The embodiments described herein conform to the rules imposed by a certain type of business entity. It is to be understood that an exchange which conforms to a different set of rules is nevertheless within the scope of the invention. Further, it is to be understood that the term "exchange" does not limit the use of the invention to an entity that is a registered exchange, that is to say, the invention may be administered by other types of business entities, such as Electronic Communications Networks (ECNs), broker-dealers, associations or others.

Described herein are embodiments of systems, methods, and computer programs therefor for receiving and processing messages for a financial exchange comprising a matching server and an FPGA component configured to receive and process information associated with a financial product operatively connected to the matching server, wherein the FPGA component is configured to receive and store a plurality of messages from at least one computer server, each message of the plurality of messages being comprised of at least one message type.

In embodiments, the system routes the consolidated options price feed and the consolidated stock feed to an FPGA. The FPGA scans these feeds and generates filtered stock update messages and filtered Options update messages. These output messages are then sent to a message gateway that routes the message to the right matcher server. The matcher server reads these messages and stores the updated away market prices. These prices are used when processing orders.

An FPGA hardware solution in the system generates market data feeds. When a transaction is processed by the matcher server in the system, a report at the price and size of the transaction must be sent to the Options Price Reporting Authority ("OPRA"). The matcher server passes information about changes in the market to the market data server. The market data server generates the market data information, formats this information into the external format, then writes the message to the network. The market data server uses an FPGA to write market data to the network.

An exemplary advantage of embodiments disclosed herein is increased capacity of exchanges by using an FPGA device to process certain messages. Conventional exchanges lack the capacity to execute and process the millions of messages sent to the exchange each second. Conventional exchanges also need to increase their capacity to read messages sent to the exchange while also delivering market data feeds to clients. Unlike conventional exchanges, the FPGA is configured not just to format and write the market data with the FPGA, but the FPGA is configured to update the quotes from the market maker in its memory and generate the data that is to be written, format it, and then write it.

To explain, an exemplary "Optimise" system implemented by the International Securities Exchange ("ISE") is "best-in-class" for capacity and complex functionality, yet there exists a growing and significant need to improve the capacity and reduce the latency for the market makers. As the underlying stock markets get faster and faster, the market makers find that they need to update their prices in the options markets faster. Conventional systems can provide capacity in the range of 30,000 messages per second, beyond which the throughput rate is limited by throttles. However, market makers find that this capacity is not enough to maintain their prices in the 480,000 instruments traded on the exchange.

To adjust for the capacity limitations, exchanges have to set limits for the throughput of the market makers to keep the servers lightly loaded. If the server is more than 50% busy, then throttling occurs in the system and it can start to develop queues of messages waiting to be processed. This poses a problem as it increases the latency observed by the traders.

Another problem arises when market makers take advantage of the throttles to trade against other market makers when there are sudden moves in the market. As the stock market moves, the market makers start to send in their quotes and are soon slowed down by the throttles. The aggressive market makers then fire off random orders trying to find a market maker who cannot move his quotes because he is blocked by the throttle. After a market maker has been caught by this trick a few times they become wary and widen out their quotes. This in turn makes a market that must throttle incoming messages less competitive. Increased capacity to process market maker quotes is vital to the competitiveness of an exchange.

Another exemplary advantage of the embodiments described herein is the ability to take a small number of simple functions that are statistically a large percentage of the total work done by a matcher server and move these onto an FPGA, leaving all complex functions on the matcher server. In options exchanges, the vast majority of messages processed by the system are mass quote messages from market makers. Other messages include away option market prices, underlying stock prices, and orders, but these message types make up less than a quarter of all messages in conventional systems.

Another exemplary advantage of embodiments of the disclosed trading system is the ability to inform users as to the state of their quote with greater accuracy, in conventional systems, when a trader receives an acknowledgement message, it does not mean that the previous quote did not trade, but rather that the new quote was processed. There may be a trade message in transit for the previous quote. The trade message and the acknowledgement message are sent via different methods and there is no synchronization between the message paths. This is an issue for traders as some trader systems fan out to multiple client trader systems. Under this setup, the main trader server is in actuality a message router for other trader servers. When one trader removes their quote, the router should be able to say if it is removed from the market and if the quote did or did not trade. One exemplary advantage of embodiments of the disclosed trading system is the ability to inform users as to the state of their quote with greater accuracy.

Figure 1:
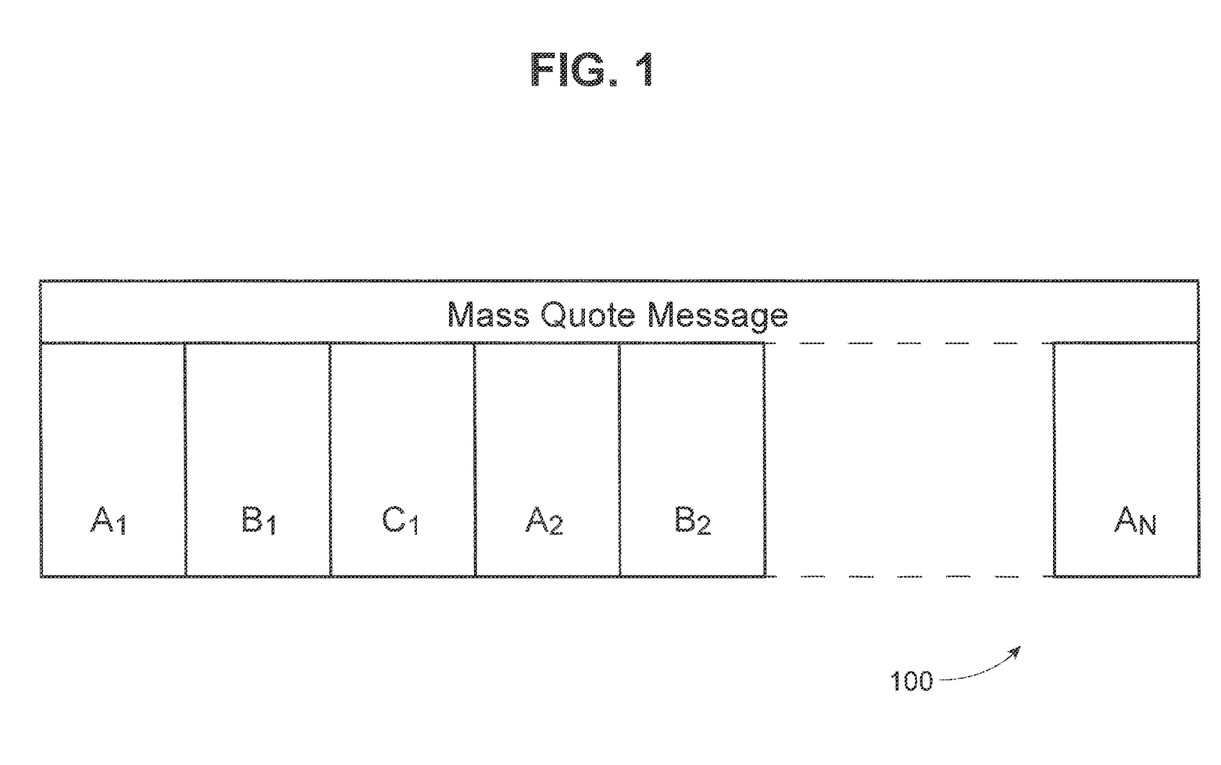
FIG. 1 illustrates a simple mass quote message according to an embodiment of the invention.

To assist market makers in submitting their prices as the markets move up and down, the exchanges offer a mass quote transaction. When an order is entered to the system by sending a message that specifies an intent to buy or sell an instrument with a quantity and a price, a market maker has to enter a bid and an offer into all instruments in a product. As explained herein, there can be thousands of instruments in a product. To improve the efficiency of entering and maintaining the prices of those orders, the market maker can use the mass quote message. FIG. 1 illustrates an example mass quote message 100. The segments of the mass quote message 100 includes individual quotes for instruments. Inside the segments, the mass quote message 100 can include information such as instrument ID $A_1$, $A_2$; buy side quantity and price $B_1$, $B_2$; and the sell side quantity and price $C_1$, $C_2$, (not shown), for an instrument, which can be repeated throughout the message An . . . . The mass quote message 100 allows the market maker to enter many such bids and offers for many such instruments into a single message 100. Market makers can enter many bid and offer quotes for many instruments in a single mass quote message 100. Because there are so many instruments and the market makers have to updates their quotes all the time, even where there are no orders, most market data prices that are generated by an options exchange are caused by market makers updating their quotes. Nonetheless, traders in options markets are quite active and the total number of orders submitted to each exchange is quite high.

As a result of the rapid pace at which market makers update quotes, options markets must be able to report prices rapidly. For example, in the US, the market data from ten different options markets, that all trade the same products, is combined into a single feed. The feed, known as the OPRA feed, could peak at over 5 million updates per second in 2012, and was growing rapidly. Moreover, securities regulations require exchanges to keep track of the current best bid and offer for each instrument traded on all other markets, and ensure that a trade does not occur at a price that is worse than the best bid or offer on any other market. Options exchanges are faced with the difficulty of efficiently receiving, processing, and transmitting quote update messages and market data feed messages. For example the ISE, which is one of the leading US options exchanges, in 2012, processes over 2 million quote updates per second from market makers, up to 5 million updates per second from the OPRA feed, and contributes over 500,000 price updates per second to the OPRA feed.

Figure 2:
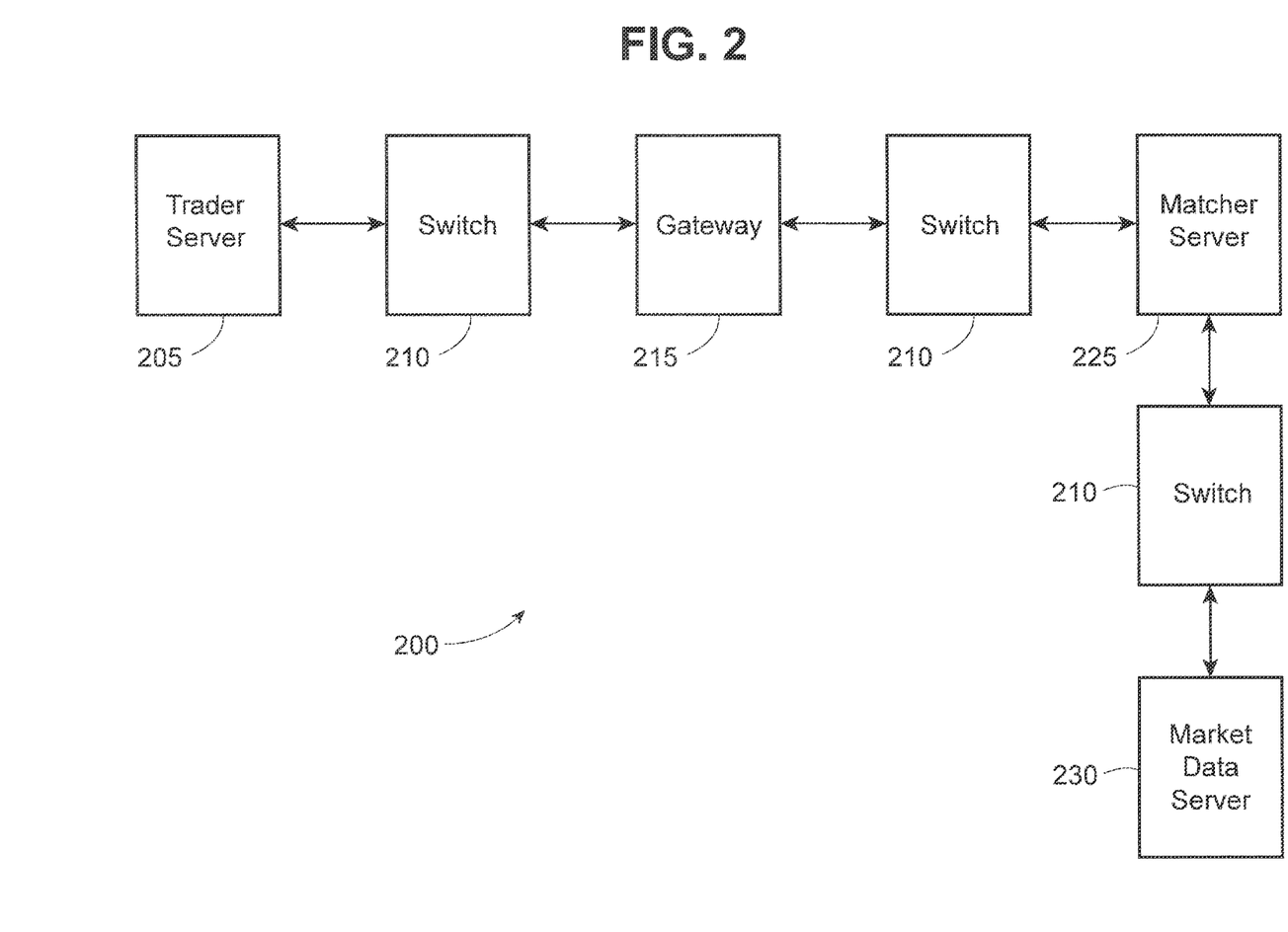
FIG. 2 shows a conventional system used to process orders and quotes.

Options exchanges use computer servers operating in parallel to receive messages—including types of messages such as order messages, market data feed messages, and mass quote messages—to process those messages and execute trades, and to disseminate market price data to other exchanges. As shown in FIG. 2, one such exemplary system, the Optimise system operated by ISE, uses application gateway servers, matcher servers, and market data servers to perform these functions.

FIG. 2 shows an exemplary system 200 used to process orders and quotes. A matcher server 225 processes each order and quote message, and sends back responses. A conventional matcher server 225 can process about 50,000 messages per second. Separate financial products are allocated to specific matcher servers 225 to balance the load across all matcher servers 225. A trader servers 205 is an example of a participant server, as for example operated by a trader, including for example a broker or market maker outside the exchange. Although only one trader server 205, as is understood in the art many trader servers provide data to the matcher server 225 as described herein. A trader can operate as a market maker that enters mass quote messages or as an agent for an investor, in which case the trader server 205 submits order messages. A gateway server 215 accepts the network connection from the trader server 205, reads messages from the trader server 205, and forwards the messages to the correct matcher server 225 for the specified product. The trader server 205, gateway server 215, matcher sever 225 and market data server 230 are each connected by interfaces or switches 210 for communication therebetween. As described herein, orders from traders, quotes from market makers, price feeds from stock markets and price feeds from other option markets all arrive as messages on the network, that go to gateways 215, that go to the servers 225, where they go into a queue, which is processed by the server 225 in sequence. As used herein, the term "interface component" refers to networking components, such as for example Network Interface cards, switches, and gateways, that interface with both local and external networks, including the Internet, and may contain processing elements.

In the exemplary system, about 15 products are matched by an individual matcher server 225. All instruments for a financial product are matched by a single matcher server 225. This is necessary because so-called complex orders—which consist of the purchase and/or sale of options contracts for more than one instrument in a product—can be executed simultaneously. The function of matching complex orders is discussed fully in U.S. Pat. No. 8,224,741, the entirety of which is incorporated herein by reference.

The gateway server 215 also validates each message from the trader server 205 and checks that the trader sending the message is permitted to do this function in the product. The gateway server 215 also communicates messages from the matcher server 225 back to the trader server 205. When the gateway server 215 gets the response from the matcher server 225, it reformats the message to an external format and writes the response back to the trader server 205. The gateway server 215 also checks the throughput rate of the session and if the maximum rate for the session has been exceeded then it delays the sending subsequent messages from the trader server 205 to the matcher server 225. This is done to ensure that the matcher servers 225 are not overloaded. Overload can occur when a trader server 205 generates more traffic than a matcher server 225 is able to process. In the exemplary ISE system, each gateway server 215 can accommodate up to 200 connections from traders and process about 50,000 messages per second to and from the matcher servers 225. It can take up to 20 gateway servers 215 to process the load from all of its customers.

The system 200 generates the market data feed according to the following process. First, the matcher server 225 processes orders and quotes that are sent by the gateway server 215 from the trader server 205. Then, the matcher server 225 updates an orderbook, which is the record of orders received by the system. The matcher server 225 sends a journal message to the market data server 230. The market data server 230 rebuilds the orderbook from the journal record and uses the rebuilt orderbook to then generate market data. In a conventional system, there is a delay of 40 microseconds to get the journal record to the market data server 230, and another 30 microseconds to process the journal record and write the market data record, from the time that the matcher server 225 finishes processing the order or quote.

As discussed below, one type of message sent by trader servers 205 is an order message. The trader server 205 sends an order message to the gateway server 215, where it is checked, reformatted and sent to the matcher server 225. The matcher server 225 processes the message and returns the result to the trader server 205. At the end of processing, the matcher server 225 sends a message to the market data server 230 which generates the market data feed.

In a conventional system, the matcher server 225 will process one message from a trader at a time to completion. When many incoming messages arrive from the gateway server 215 in quick succession, they are placed in a queue and processed one at a time. The trader will get an acknowledgement message after the matcher server 225 finishes processing each incoming message to inform the trader that the processing was either successful or rejected with an error. If it is successful, the trader is told in a trade message if the new order or quote was put on the book, traded out, or partially traded, or some combination of both.

Away Options Market Prices

As used herein, away markets refer to option markets run by other exchanges. US market regulations require that an exchange know the prices offered by away markets—referred to as away market prices—when processing each order so that the exchange does not trade through the away market prices. However, away market price updates from the other exchanges represent a much larger amount of incoming messages than order messages for the matcher server. In one embodiment, the system moves the function of processing away options market prices messages so that they are processed by an FPGA that is operatively connected to each matcher server.

Figure 3:
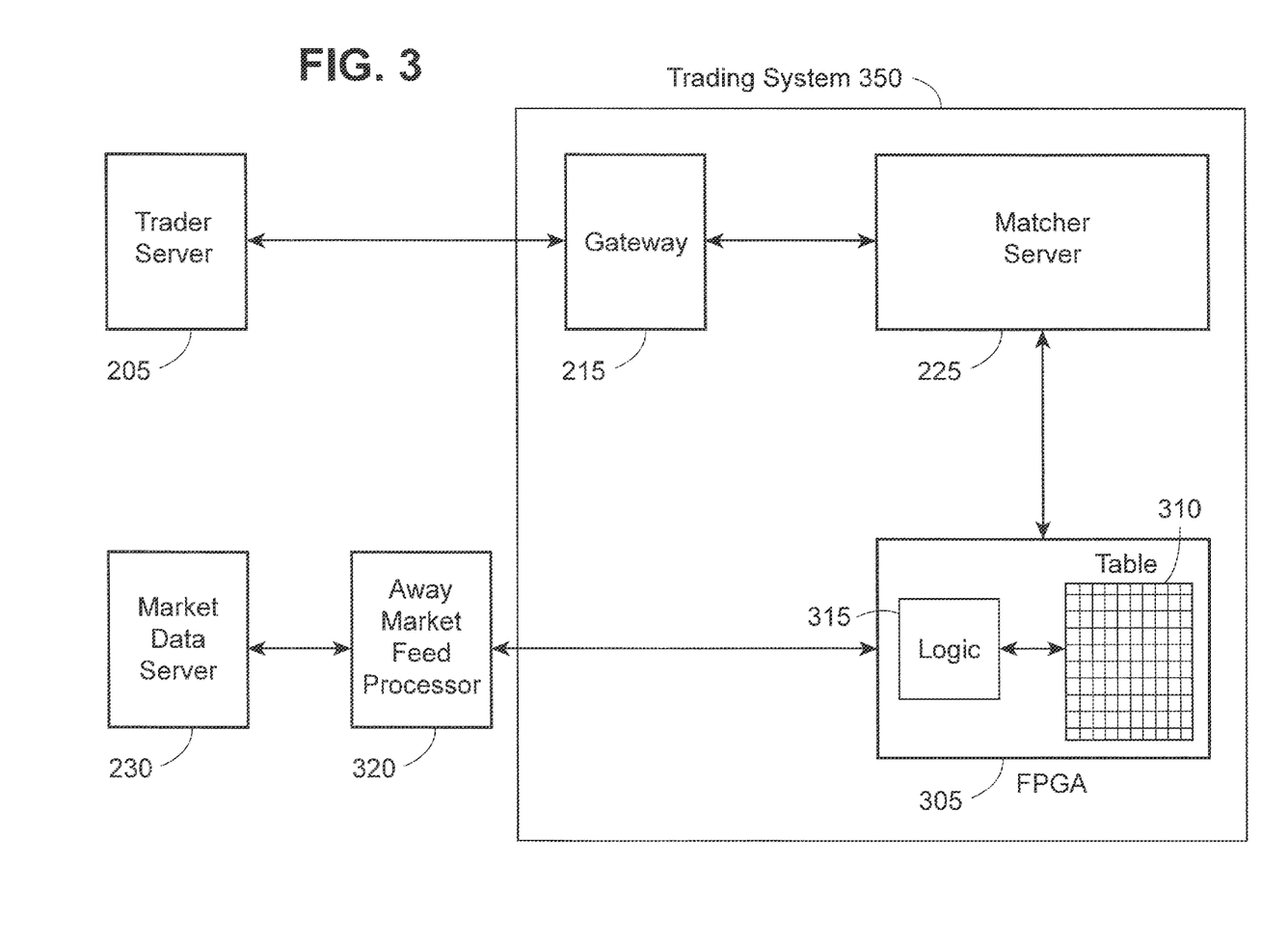
FIG. 3 depicts an example of a system with a matcher server comprising or operatively connected to a circuit such as an integrated circuit, FPGA board or ASIC and configured to process away market prices.

FIG. 3 depicts an example of a trading system 350 as shown in FIG. 2 with a matcher server 225 comprising or operatively connected to an FPGA board 305. In an exemplary embodiment, the system is configured to process away market prices provided from a market data provider 230 such as an OPRA or Commodity Trading Advisor other market data consolidator. The market data provider 230 sends a data feed including away market prices to an away market feed processor 320. The away market feed processor 320 routes the away market prices to the FPGA 305. The FPGA 305 reads and saves the most recent price in its memory. When the matcher server 225 receives an order from a trader 205 via a gateway server 215, the matcher server 225 queries the FPGA 305 and asks it to supply the most recent away market prices to the matcher server 225. The matcher server 225 then processes the order and determines if the order can trade against a quote for the respective instrument.

In an embodiment, the away market feed processor 320 that reads and processes the away market prices and sends away market prices directly to the FPGA card 305 rather than sending the message to the matcher server 225 via the gateway 215. One advantage of this configuration is that it can eliminate a number of connections between elements of the system compared to conventional systems. The FPGA 305 is faster at reading the away market feed compared to a conventional network card. Bypassing the gateway server 215 connection for away market prices and sending them directly to the FPGA 305 brings the time to process an away market price in the range of 6 microseconds whereas the conventional system is in the range of 150 microseconds. The transmission time for a trader to send a message and get the response back is about 4 microseconds each way. Thus, the total round trip is in the range of 14-15 microseconds-much lower than the 350 microseconds it takes without an FPGA. The example speeds described here and elsewhere can be expected to increase over time.

In an embodiment, the away prices are stored in a table 310 on the FPGA 305. When the matcher server 225 receives an order, it calls the FPGA 305 and asks for the away market prices for the specified instrument. The away market prices are stored on a table 310 located on the FPGA 305. The logic 315 located on the FPGA is configured to receive the request for away market prices from the matcher server 225 and pulls the information from the specific location in the FPGA table 305. The step of calling the FPGA takes 2 microseconds, which adds to the 150 microseconds that the matcher server 225 spends on the order, but the matcher server 225 no longer needs to process away market price messages, which outnumber the orders by a thousand to one, and thus the process reduces overall latency for traders on the system.

Mass Quote Messages

In an exemplary embodiment, the system including the FPGA component is configured to process mass quote messages. In exchanges, mass quote messages represent the majority of all messages processed by a matcher server. In a conventional system without an FPGA card 305 to process mass quote messages, each mass quote message is processed by a matcher server 225 in a similar fashion to an order message. In conventional systems, when a matcher server 225 processes a mass quote message, it first updates the orderbook contained in the matcher server, then checks to see if any portion of the mass quote can trade, and finally updates the system's market data. However, although mass quote messages and order messages are similar, while market makers want order messages to trade on entry, market makers almost never want mass quotes to trade on entry since the market maker is providing quotes that customers can trade against to the profit of the market maker. A mass quote that trades on entry is normally an error.

Figure 4:
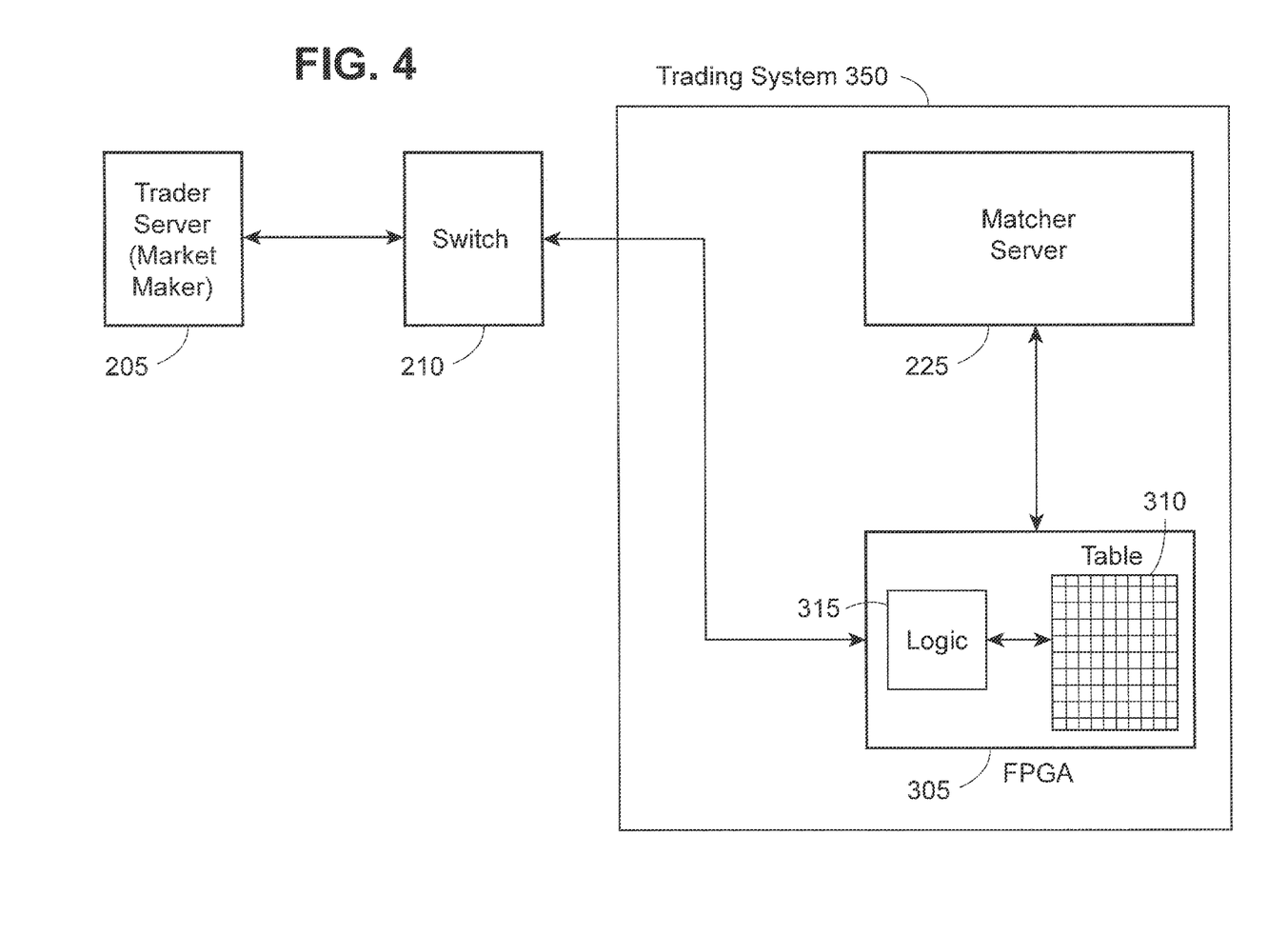
FIG. 4 depicts an example of a system with a matcher server comprising or operatively connected to an FPGA board and configured to process mass quote messages.

According to an embodiment, mass quote messages are manipulated in order to be processed by an FPGA. The system is configured to process mass quote messages as a data feed for the FPGA to process sequentially. FIG. 4 depicts an example of a system with a matcher server 225 comprising or operatively connected to an FPGA board 305 and configured to process mass quote messages. The mass quote messages for a market maker are first sent from a trader server 205 to the trading system 350 via a switch 210, which sends the message directly to the FPGA 305. The FPGA logic 315 reads the mass quote message and parses the individual quotes contained in the mass quote. The FPGA logic 315 then sends the individual quotes for storage in the FPGA.

Figure 4A:
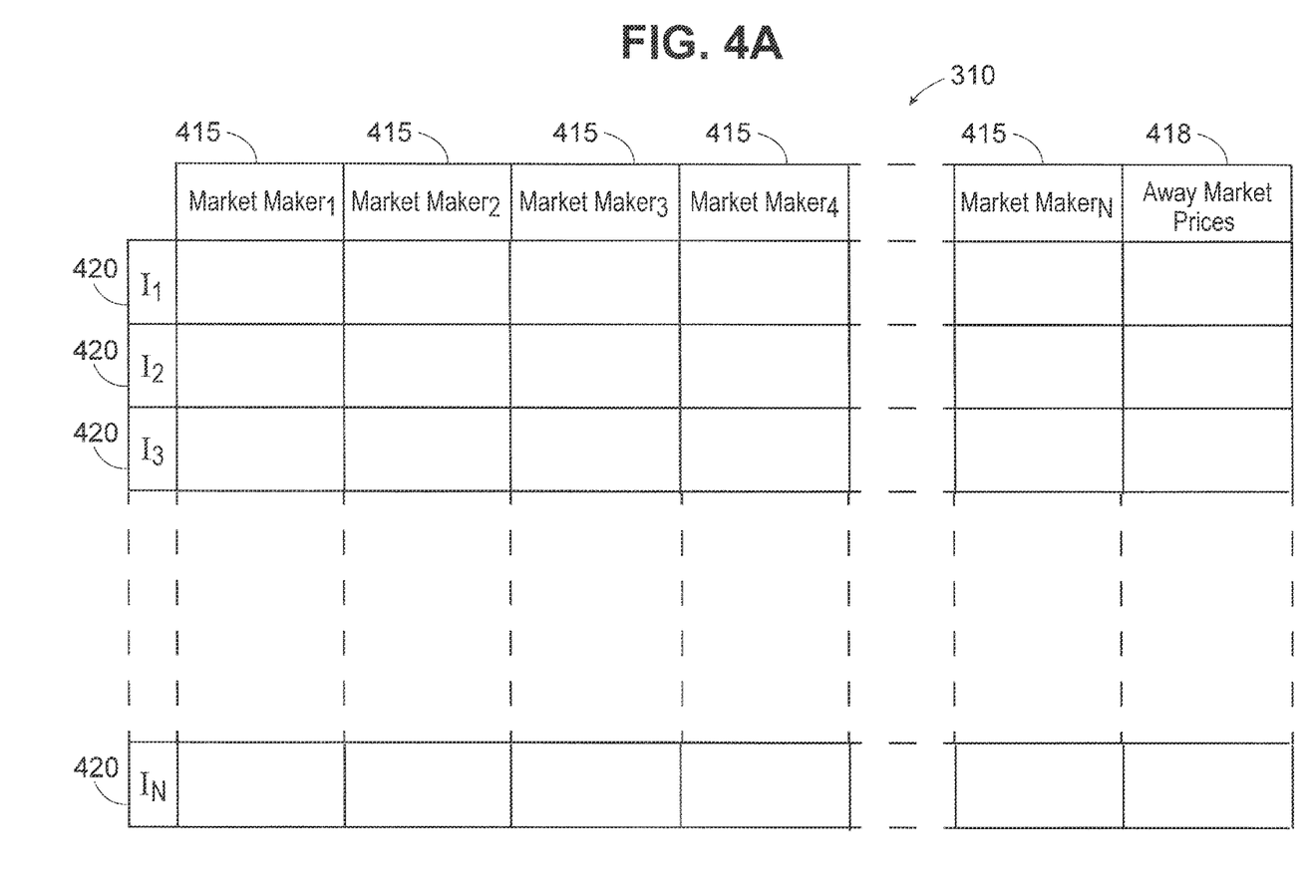
FIG. 4A depicts an example of a storage format located in an FPGA board.

The quotes are stored in the FPGA. The format of the stored data can be in any format configured to store the information as disclosed herein in. Thus while FIG. 4A depicts an example of a table located in an FPGA board, a table format is but one example of the storage format—any data storage record format configured to store and organize the information can be used. The FPGA table 310 is configured so that each column 415 of the table is reserved for an individual market maker for the exchange, and the each row 420 is reserved for an individual instrument that is listed on the exchange. The FPGA logic 315 directs the individual quotes to the location in the FPGA table 310 that corresponds to the correct market maker and correct instrument and stores the quote in that location. The table 310 also includes a column for away market prices 418 from other exchanges.

The FPGA is configured to process each quote item very quickly and prevent throttling in the system. For example, in an embodiment, when a mass quote message is processed by the FPGA, each quote is checked to see if it can trade with existing quotes or with orders in the book. If the prices do match or overlap, the FPGA will send a message to the server to ask it to examine the orders and quotes and execute anything that overlaps. To ensure that market makers do not have a competitive advantage over other traders, the message is sent from the FPGA to a gateway, to be sent back to the server, in the same way as a regular order.

Order Messages

Figure 5:
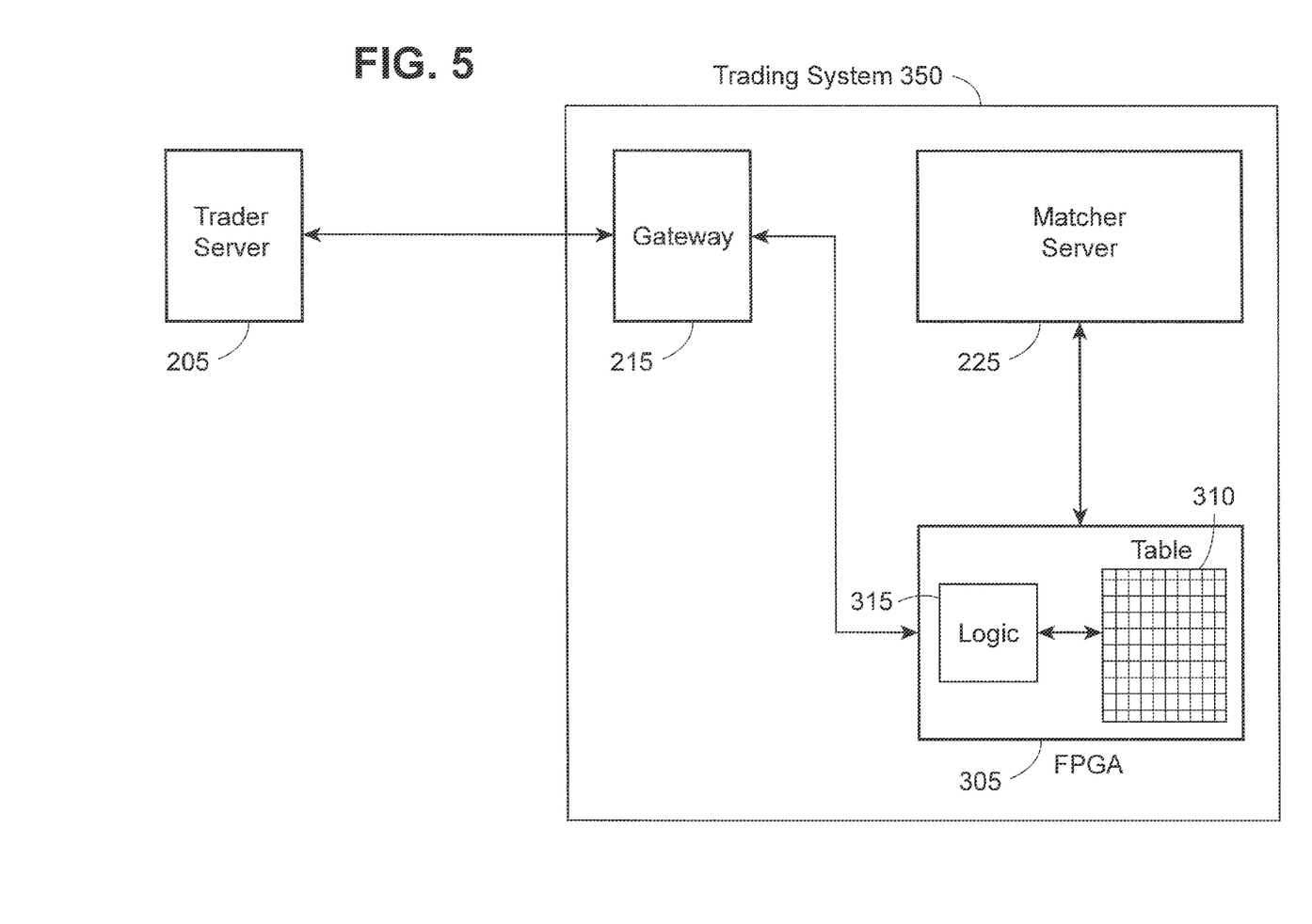
FIG. 5 depicts an example of a system with a matcher server comprising or operatively connected to an FPGA board and configured to process order messages.

According to an embodiment, FIG. 5 depicts an example of a system with a matcher server 225 comprising or operatively connected to an FPGA board configured to process order messages. For a matcher server 225 to process order messages, the matcher server must have access to the quotes and away market data stored in an FPGA, for example in an FPGA table or other data storage record format. A trader server 205 sends order messages to the trading system 350, where the order messages are received by a gateway server 215, which in turn sends the order message to the matcher server 225. The matcher server 225 places the order message in a queue for sequential processing. Once an order message has reached the front of the queue and the matcher server 225 is ready to process the order, the matcher server 225 queries the FPGA logic 315 for the information pertaining to the order. This information includes the quote prices for the corresponding instrument from all the market makers currently offering a quote for the instrument, as well as the away market prices for the instrument, and other information as may be needed or desired. The FPGA logic 315 reads the information from the location in the FPGA table 310 relating to the specific instrument and sends the information back to the matcher server 225. The matcher server 225 then processes the Order with the information to determine if the order can fully trade, partially trade, or not trade at all. If the matcher server 225 determines the order can at least partially trade, it executes the trade and sends response and trade information to the trader server 205 that sent the order. After the processing is complete, the matcher informs the FPGA 305 of the change including change to the orders in the book, any trades, and changes to quotes as a result of the trade. The FPGA card 305 then updates the information stored on the card, generates market data and sends information messages to the market makers server 205 to advise them of any trades and changes to their quotes.

Stock Price and Trading State Messages

Options exchanges must also handle incoming messages concerning underlying stock prices and the trading state of the underlying market. Options exchanges need to know the trading state of markets, since as described above, regulation require that the options exchange must automatically halt if the underlying market halts. Options exchanges also need stock prices to process the small number of orders that want to trade stock and options for a net price. In embodiments, stock price messages and trading state messages are sent directly to an FPGA.

In an embodiment, the system depicted FIG. 3 depicts an example of the system with a matcher server 225 comprising or operatively connected to an FPGA board 305 being configured to process underlying stock prices from a trader server 205. Underlying stock price messages 605 are sent directly to the FPGA 305 via gateway 215. The FPGA logic 315 reads the underlying stock price and updates the information relating to the instruments affected by the updated underlying stock price in the FPGA table 310. The FPGA 305 then saves the stock price until a stock-option order is received by the matcher server 225. When the matcher server 225 receives a stock-option order, the matcher server 225 executes the order as described in FIG. 5.

Figure 6:
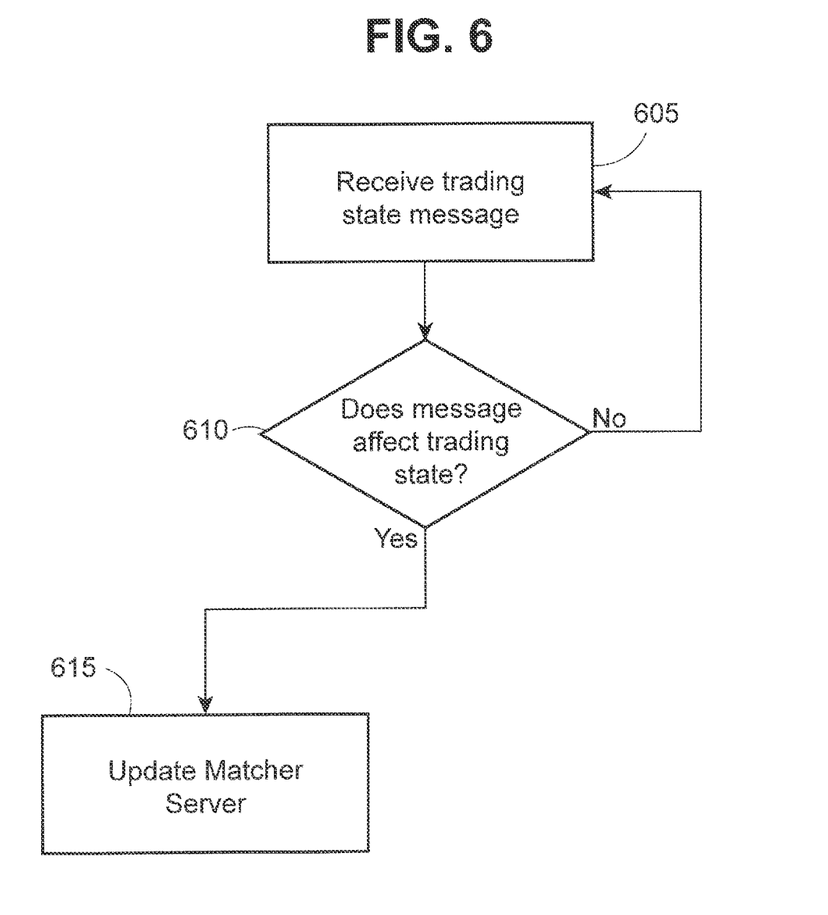
FIG. 6 depicts an example of a system with a matcher server comprising or operatively connected to an FPGA board and configured to process underlying trading state messages.

In an embodiment, FIG. 6 shows a block diagram of the method by which trading state messages are processed by an FPGA board. In block 605, the FPGA card receives a message from an interface component concerning the trading state of an underlying instrument. The FPGA logic, in block 610, reads the trading state message to determine if the trading state of the underlying instrument has changed. If it has, the FPGA logic sends a message to the matcher server in block 615 to inform the matcher server of the change. The matcher server then updates the state of the product that relates to that underlying instrument. If the trading state of the product is changed, then a message is sent to the FPGA so that the new trading system can be sent out on the market data.

Generating Market Data

In an embodiment, the FPGA is configured to examine all the quotes processed and stored thereon after each update and generate market data immediately. Due to the speed of the FPGA, there is no substantially measurable delay between the processing of the quotes and the generation of the market data. For example, market data messages can be generated after about 10 microseconds, compared to over 70 microseconds in conventional systems. Thus an exemplary advantage of the embodiment is that the FPGA is configured to generate market data using the quotes that enter the system where the quotes are stored and updated on the FPGA.

Figure 7:
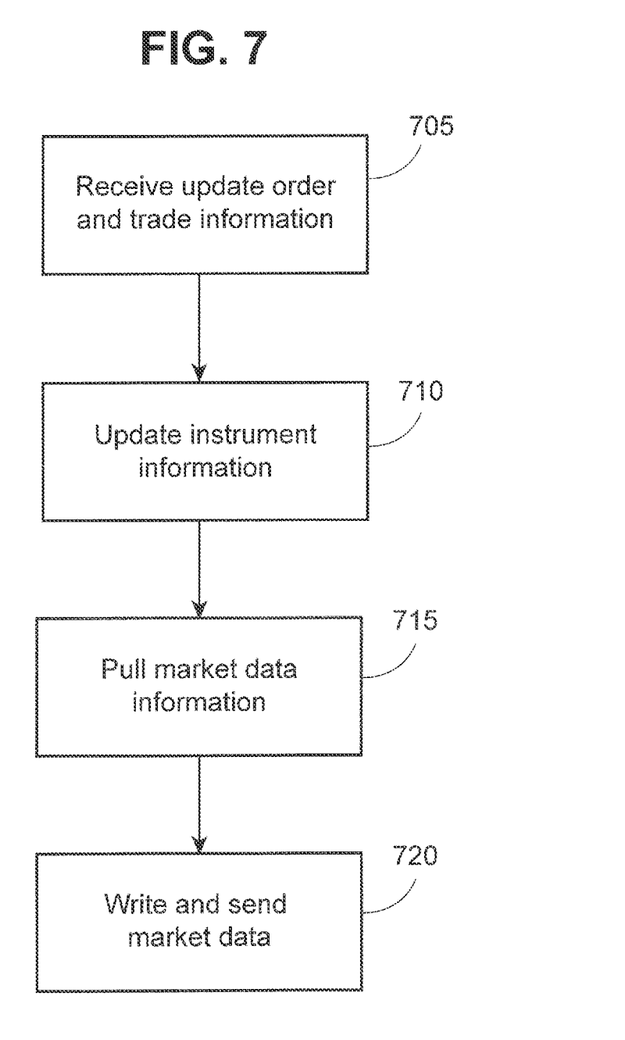
FIG. 7 depicts a block diagram of the process used by an FPGA board to generate market data.

In an embodiment order messages are processed by the matcher server 225 itself, although quotes are sent directly to the FPGA 305. Thus, in an embodiment, when creating the market data feed, the FPGA 305 is configured to include knowledge of the matcher server's 225 operation. FIG. 7 depicts a block diagram of the process used by an FPGA board to generate market data. After processing an order message, the matcher server 225 sends the relevant information pertaining to that order to the FPGA 305, and, in block 705, the FPGA receives the updated order and trade information so that the FPGA 305 has the information needed to generate the market data. For example, the FPGA can examine all quotes in the instrument, and all orders, to determine the best hid price, and the quantity available at the best bid, and the offer price, and the quantity available at the best offer, and the total traded quantity, and the size and price of the last trade. At block 705 the FPGA also receives quote information from market makers. In block 710, the FPGA 305 updates the information stored in the FPGA table relating to the specific instrument implicated in the order. In block 715, the updated information is pulled from the FPGA table, as well as the relevant market data information in all the instruments to generate the market data feed. In block 720, the market data feed is written out and sent. For example, in an embodiment the FPGA can write out a message with the quote information listed above, which is then sent to another server outside the trading system where it is reformatted and distributed on the market data feeds and sent to OPRA. In another embodiment the FPGA can do this processing itself and write the market data directly to the public market data feeds and to OPRA.

Accordingly, the FPGA is configured to have relevant information about the orders so it can be configured to send out market data. For example, in an embodiment, after processing each order, the matcher server 225 sends information to the FPGA about the state of all orders in the matches book for that orders instrument, along with any trades that resulted from processing the order, and any changes to any quotes that traded with the order. When this information is received by the FPGA, the FPGA updates the quotes, and its copy of the orders in the matcher server's 225 orderbook, and the trade totals. And then the FPGA generates a market data update message for this instrument.

In the FPGA system, the matcher server 225 only needs to update the FPGA 305 if an order changes the contents of the orderbook. Many order messages sent to options exchanges are Immediate or Cancel Order ("IOC") orders— orders to buy or sell a financial instrument that are canceled if not immediately filled—sent from high frequency traders that do not change the orderbook if they do not trade, and do not require that the matcher server 225 update the FPGA 305. The number of orders is insignificant compared to the number of quotes. Only a small number of orders will result in updates being sent to the FPGA so the updating of this information is not a significant overhead for the FPGA or the server.

Acknowledgement Messages

Adding an FPGA to an exchange system presents an issue when delivering acknowledgement messages to Market Makers. In an FPGA exchange system, a Market Maker can submit updates to previously submitted quotes while the matcher is still processing the current quote because the matcher does not have the speed of the FPGA board. For instance, a Market Maker could update a quote ten times, each with a successful response, and then be informed that the quote from ten messages ago traded successfully. This problem is exacerbated because the FPGA can process quotes many times faster than the matcher can process orders.

According to an embodiment, to correct for the relative delay in processing orders, the FPGA system includes additional sequence numbers in acknowledgement messages to indicate if an older quote is still being processed. The market maker will know from the acknowledgement if it still has a potential liability to an older quote.

Figure 8:
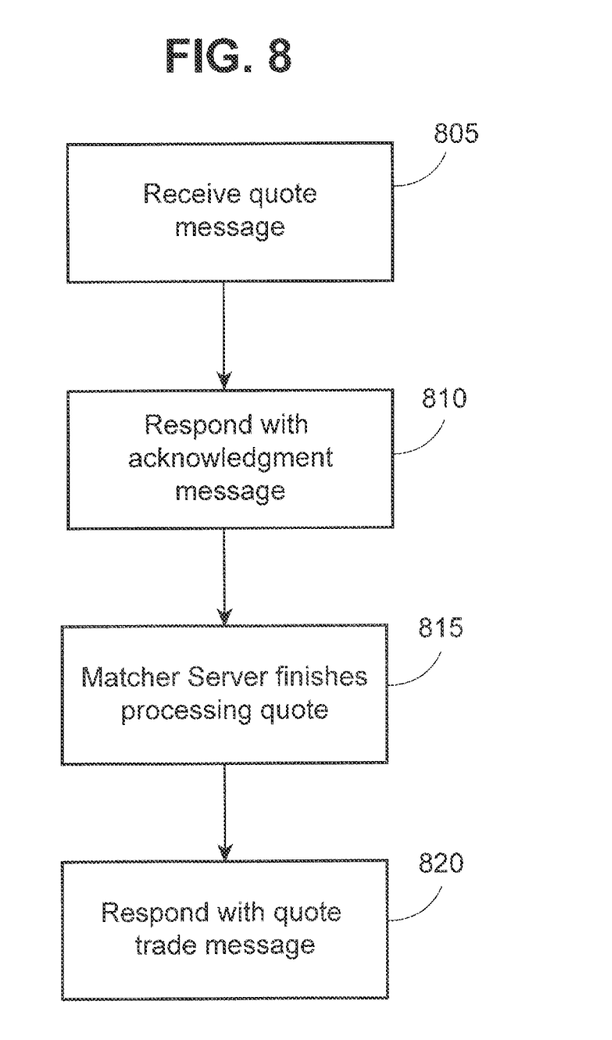
FIG. 8 shows a block diagram of the process used to send acknowledgement messages from an FPGA board.

FIG. 8 shows a block diagram of the process used to send acknowledgement messages from an FPGA board. In block 805, the FPGA receives a quote message from a trader. The FPGA records the sequence number of each quote and transfers the quote to the matcher server in block. In block 810, the FPGA responds with acknowledgement messages stating that the FPGA received the quote but that the matcher server is still processing the previous quote. As shown at block 815, when the matcher server is finished processing an order, the server sends a message to the FPGA indicating it has processed the order. As shown at block 820, this triggers the FPGA to send another message to the market maker. That message says that the server is no longer working on that old quote, and the new quote is now current in that one instrument. As will be appreciated, there can be many market makers with quotes in the instrument that was being processed. The FPGA has to send a message each market maker to say that the server is finished with that old quote and the new quote is now active. Thus a separate message is sent to each trader server that submitted a quote for the instrument.

As will be appreciated, orders from traders, quotes from market Makers, price feeds from stock markets and price feeds from other option markets all arrive as messages on the network, which go to gateways 215, that to the matching server 255, where they go into a queue, which is processed by the server 225 in sequence. However the main purpose of the exchange system 350 is to trade the orders against the quotes and against other orders. And the orders are less than 1% of all traffic that is processed by the server. Thus an advantage of the embodiment described herein that the system 350 puts the hulk of the traffic, which are quotes, stock feeds and option price feeds, and processes them in a separate process at an integrated circuit such as FPGA or ASIC which is separate from the matching server 225, and the matching server 22 need only processing the orders. Before the matching server 225 processes each order, it gets the latest stock price, option, prices from other exchanges, and quotes from market makers that are relevant to the instrument of the order. This way the matching server 225 is just processing orders, while the other traffic, which represents over 99% of all the traffic processed in parallel at the integrated circuit 305 separate from but operatively connected to the matching server 225.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A system, comprising:
a matcher server configured to process electronic order messages, and
a field programmable gate array (FPGA) circuit operatively connected to the matcher server the FPGA circuit, comprising logic; and memory configured to store information with a predetermined data storage format, wherein the FPGA circuit is configured to perform the following operations:
receive electronic mass quote messages, each electronic mass quote message including a plurality of individual electronic quote messages, each one of the plurality of individual electronic quote messages including a corresponding price value, and a corresponding instrument identifier, wherein each of the electronic mass quote messages is provided to the FPGA circuit from one or more market maker computers external to the system bypassing the matcher server;
process the electronic mass quote messages including parsing each of the individual electronic quote messages and extracting quote data;
store the quote data in the predetermined data storage format in the memory according to the corresponding price value and the corresponding instrument identifier;
receive electronic away market feed messages, each of the electronic away market feed messages including a price value and an instrument identifier, wherein each of the away market feed electronic messages is provided to the FPGA circuit from one or more away market feed processors external to the system bypassing the matcher server;
process each of the electronic away market feed messages and extract away market feed data;
update information stored in the predetermined data storage format in the memory based on the away market feed data; and
in response to a query sent by the matcher server for an electronic order associated with a particular order indicator, transmit information stored in the predetermined data storage format associated with the particular order indicator, wherein the information is based on away market feed data for the particular order indicator and individual quote data for the particular order indicator, and
wherein providing the electronic mass quote messages to the FPGA circuit and bypassing the matcher server, providing the electronic away market feed messages to the FPGA circuit and bypassing the matcher server, processing the electronic mass quote messages at the FPGA circuit, and/or processing the electronic away market feed messages at the FPGA circuit reduces processing latency in the system.

2. The system of claim 1, wherein the system includes one or more gateway servers, and wherein the FPGA circuit is configured to receive at least one of the electronic mass quote messages and the electronic away market feed messages without having to be processed by the one or more gateway servers.

3. The system of claim 1, wherein the FPGA circuit is further configured to:
receive, from the matcher server, a match message;
update information stored in the predetermined data storage format based on the match message; and
generate and transmit a data feed update electronic message.

4. The system of claim 1, wherein the FPGA circuit is further configured to:
determine one of the individual electronic quote messages corresponds to a match, and in response, generate and send a match-related message for the matcher server.

5. The system of claim 1, wherein the FPGA circuit is further configured to:
send, in response to reception of an electronic quote message, at least one acknowledgement electronic message,
wherein each acknowledgement electronic message includes a sequencer number that corresponds to a logical processing order for a corresponding individual electronic quote message.

6. The system of claim 1, wherein the update of the information stored in the predetermined data storage format in the memory based on the away market feed data includes update of a most recent price value for a corresponding order indicator along with a predetermined code.

7. The system of claim 1, wherein the FPGA circuit is further configured to:
filter the electronic away market feed messages;

generate update messages from filtered messages, and transmit some of the update messages to the matcher server.

8. A method comprising the following steps:

processing, by a matcher server, electronic order messages, the matcher server operatively connected to a field programmable gate array (FPGA) circuit including logic and memory configured with a predetermined data storage format for storing information, where the matcher server and the FPGA circuit are part of a system;

receiving, by the FPGA circuit, electronic mass quote messages, each electronic mass quote message including a plurality of individual electronic quote messages that are bundled into the electronic mass quote message, each one of the plurality of individual electronic quote messages including, a corresponding price value, and a corresponding instrument identifier, wherein each of the electronic mass quote messages is provided to the FPGA circuit from one or more market maker computers bypassing the matcher server;

processing, by the FPGA circuit, the electronic mass quote messages including parsing each of the individual electronic quote messages and extracting quote data and storing the quote data in the predetermined data storage format in the memory according to the corresponding price value and the corresponding instrument identifier;

receiving, by the FPGA circuit, electronic away market feed messages from one or more away market feed processors bypassing the matcher server, where each of the electronic away market feed messages includes a price value indicator and an instrument identifier;

processing, by the FPGA circuit, each of the electronic away market feed messages including extracting away market feed data and updating information stored in the predetermined data storage format in the memory based on the away market feed data; and in response to a query sent by the matcher server for an electronic order associated with a particular order indicator, transmitting, by the FPGA circuit, information stored in the predetermined data storage format associated with the order indicator, wherein the information is based on away market feed data for the particular order indicator and individual quote data for the particular order indicator, and wherein the FPGA circuit performing the steps reduces latency in processing electronic messages in the system.

9. The method of claim 8, wherein the FPGA circuit receives at least one of the electronic mass quote messages and the electronic away market feed messages without having the at least one of the electronic mass quote messages be processed by one or more gateway servers.

10. The method of claim 8, further comprising:

receiving, at the FPGA circuit from the matcher server, a match message;

updating, by the FPGA circuit, information stored in the predetermined data storage format based on the match message; and generating, by the FPGA circuit, and transmitting a data feed update electronic away market feed message.

11. The method of claim 8, further comprising:

determining, by the FPGA circuit, one of the individual electronic quote messages corresponds to a match, and in response, generating and sending, by the FPGA circuit, a match-related message for the matcher server.

12. The method of claim 8, further comprising:

sending by the FPGA circuit, in response to reception of an electronic mass quote message, at least one acknowledgement electronic message, wherein each acknowledgement electronic message includes a sequencer number that corresponds to a logical processing order for a corresponding individual electronic away market feed message.

13. The method of claim 8, wherein the updating of the information stored in the predetermined data storage format in the memory based on the away market feed data includes updating a most recent price value for a corresponding order indicator along with a predetermined code.

14. The method of claim 8, further comprising:

filtering, by the FPGA circuit, the electronic away market feed messages;

generating, by the FPGA circuit, update messages from filtered messages, and transmitting some of the update messages to the matcher server.

15. The method of claim 8, wherein the system includes an electronic exchange and the electronic away market feed messages include away market price data from one or more other electronic exchanges.

16. The system of claim 1, wherein the system includes an electronic exchange, the electronic away market feed messages of the third type include away market price data from one or more other electronic exchanges.

* * * * *